US010096123B2

(12) United States Patent
Zhu et al.

(10) Patent No.: US 10,096,123 B2
(45) Date of Patent: Oct. 9, 2018

(54) METHOD AND DEVICE FOR ESTABLISHING CORRESPONDENCE BETWEEN OBJECTS IN A MULTI-IMAGE SOURCE ENVIRONMENT

(71) Applicant: Cisco Technology, Inc., San Jose, CA (US)

(72) Inventors: Xiaoqing Zhu, Austin, TX (US); Robert Edward Liston, Menlo Park, CA (US); Wai-tian Tan, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 129 days.

(21) Appl. No.: 15/132,679

(22) Filed: Apr. 19, 2016

(65) Prior Publication Data

US 2017/0300777 A1 Oct. 19, 2017

(51) Int. Cl.
| | |
|---|---|
| *G06K 9/00* | (2006.01) |
| *G06T 7/20* | (2017.01) |
| *G06K 9/62* | (2006.01) |
| *G06K 9/46* | (2006.01) |
| *G06T 7/00* | (2017.01) |

(52) U.S. Cl.
CPC .......... *G06T 7/204* (2013.01); *G06K 9/4642* (2013.01); *G06K 9/4652* (2013.01); *G06K 9/6202* (2013.01); *G06K 9/6215* (2013.01); *G06T 7/0044* (2013.01); *G06T 2207/10016* (2013.01)

(58) Field of Classification Search
CPC .............. G06T 7/2093; G06K 9/00771; G06K 9/00785; G06K 2209/21; G06K 9/6202; G06K 9/6215; G06K 9/4642; G06K 9/4652; A61B 2034/2057
USPC ....................................................... 382/103
See application file for complete search history.

(56) References Cited

U.S. PATENT DOCUMENTS

| | | | |
|---|---|---|---|
| 5,768,443 A | 6/1998 | Michael et al. | |
| 7,319,479 B1 | 1/2008 | Crabtree et al. | |
| 7,450,735 B1 | 11/2008 | Shah et al. | |
| 9,124,873 B2 | 9/2015 | Liu et al. | |
| 9,247,214 B2 | 1/2016 | Aoki et al. | |
| 2010/0166262 A1* | 7/2010 | Wedge | G06K 9/00369 382/103 |

(Continued)

OTHER PUBLICATIONS

"Vicon Tracker Guide 2.0," Vicon Motion Systems Ltd., Mar. 2013.

(Continued)

*Primary Examiner* — Van D Huynh
(74) *Attorney, Agent, or Firm* — Fernando & Partners LLP; Prateek Bhatnagar

(57) ABSTRACT

In one implementation, a method includes generating a set of candidate objects based at least in part on a set of image data, where the set of image data includes image data from a plurality of image sources. The method also includes generating a set of visual signatures, wherein each of the visual signatures in the set of visual signatures characterizes a candidate object in the set of candidate objects. The method further includes transforming at least two candidate objects in the set of candidate objects into a single object according to a determination that correspondence between visual signatures for the at least two candidate objects satisfies one or more correspondence criteria.

20 Claims, 11 Drawing Sheets

(56) References Cited

U.S. PATENT DOCUMENTS

| | | | | |
|---|---|---|---|---|
| 2013/0212094 A1* | 8/2013 | Naguib | ............... | G01C 21/206 |
| | | | | 707/730 |
| 2014/0072174 A1* | 3/2014 | Wedge | ................ | G06K 9/6202 |
| | | | | 382/103 |
| 2014/0328512 A1* | 11/2014 | Gurwicz | ............. | G06K 9/6263 |
| | | | | 382/103 |

OTHER PUBLICATIONS

Chang, et al., "Tracking Multiple People with a Multi-Camera System," IEEE Workshop on Multi-Object Tracking, Vancouver, BC, 2001, pp. 19-26.

Khan, et al., "Human Tracking in Multiple Cameras," IEEE International Conference on Computer Vision, Vancouver, BC, 2001, pp. 331-336.

Fleuret, et al., "Multicamera People Tracking with a Probabilistic Occupancy Map," IEEE Transactions on Pattern Analysis and Machine Intelligence, vol. 30, No. 2, pp. 267-282, Feb. 2008.

Khan, et al., "Tracking Multiple Occluding People by Localizing on Multiple Scene Planes," IEEE Transactions on Pattern Analysis and Machine Intelligence, vol. 31, No. 3, pp. 505-519, Mar. 2009.

Stancil, et al., "Active Multi-Camera Networks: From Rendering to Surveillance," IEEE Journal of Selected Topics in Signal Processing, vol. 2, No. 4, pp. 597-605, Aug. 2008.

Dureshi, et al., "Smart Camera Networks in Virtual Reality," ACM/IEEE International Conference on Distributed Smart Cameras, Vienna, 2007, pp. 87-94.

\* cited by examiner

FIG. 2A

Pairing 210: {(CO 112-1, Frame 106-A-1), (CO 116-3, Frame 106-C-1)} Similarity Score 220: 0.7

Pairing 212: {(CO 114-2, Frame 106-B-1), (CO 116-2, Frame 106-C-1)} Similarity Score 222: 0.9

200-A

| | 112-1 | 112-2 | 112-3 | 114-1 | 114-2 | 114-3 | 116-1 | 116-2 | 116-3 | 116-4 |
|---|---|---|---|---|---|---|---|---|---|---|
| 112-1 | 1 | 0 | 0 | 0.1 | 0.1 | 0.9 | 0.1 | 0.1 | 0.7 | 0.1 |
| 112-2 | 0 | 1 | 0 | 0.2 | 0.8 | 0.1 | 0.1 | 0.8 | 0.1 | 0.1 |
| 112-3 | 0 | 0 | 1 | 0.1 | 0.1 | 0.1 | 0.7 | 0.1 | 0.1 | 0.1 |
| 114-1 | 0.1 | 0.2 | 0.1 | 1 | 0 | 0 | 0.1 | 0.1 | 0.1 | 0.7 |
| 114-2 | 0.1 | 0.8 | 0.1 | 0 | 1 | 0 | 0.1 | 0.9 | 0.1 | 0.1 |
| 114-3 | 0.9 | 0.1 | 0.1 | 0 | 0 | 1 | 0.1 | 0.1 | 0.7 | 0.1 |
| 116-1 | 0.1 | 0.1 | 0.7 | 0.1 | 0.1 | 0.1 | 1 | 0 | 0 | 0 |
| 116-2 | 0.1 | 0.8 | 0.1 | 0.1 | 0.9 | 0.1 | 0 | 1 | 0 | 0 |
| 116-3 | 0.7 | 0.1 | 0.1 | 0.1 | 0.1 | 0.7 | 0 | 0 | 1 | 0 |
| 116-4 | 0.1 | 0.1 | 0.1 | 0.7 | 0.1 | 0.1 | 0 | 0 | 0 | 1 |

Column groupings: 112-1 to 112-3 → 106-A-1; 114-1 to 114-3 → 106-B-1; 116-1 to 116-4 → 106-C-1.
Row groupings: 112 → 106-A-1; 114 → 106-B-1; 116 → 106-C-1.

FIG. 2B

METHOD AND DEVICE FOR ESTABLISHING CORRESPONDENCE BETWEEN OBJECTS IN A MULTI-IMAGE SOURCE ENVIRONMENT

TECHNICAL FIELD

The present disclosure generally relates to tracking objects, and in particular, to systems, methods, and devices for establishing correspondence of objects across multiple views.

BACKGROUND

Using multiple cameras to identify and track objects is an active area of computer vision research. One common challenge to existing approaches is the reliance of states, that are assumed to be accurate, whereupon current observations are used to update the states. While many techniques have been proposed to avoid errors in state estimation, inadvertent state errors (e.g., coming from inaccurate observations) may persist for a long time period even after the observation errors are introduced, resulting in poor tracking performance.

Given a collection of camera views there may be redundancies between detected objects, which can be exploited to perform object tracking, counting, characterization, and the like. However, an object detected in more than one camera view may have different appearances, which introduces a challenge for establishing correspondence across camera views.

For example, a group of objects {A, B, C} appear in a collection of frames captured by cameras with overlapping field of views. For the purpose of object localization and tracking, proper correspondence for these objects is established across camera views, for example, to associate object A with candidate object 1 in camera view 1, candidate object 3 in camera view 2, candidate object 2 in camera view 3, and so on. While it is relatively straightforward to identify an object (e.g., a book, a coffee mug, a pen, etc.) by matching its visual features to the features of a previously identified or pre-characterized object in a library, it is a challenge to establish such similar correspondence when no prior information exists for an unknown object in a scene.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2A is a representation of a first instance of a correspondence matrix in accordance with some implementations.

FIG. 2B is a representation of a second instance of a correspondence matrix in accordance with some implementations.

Figure 1A:
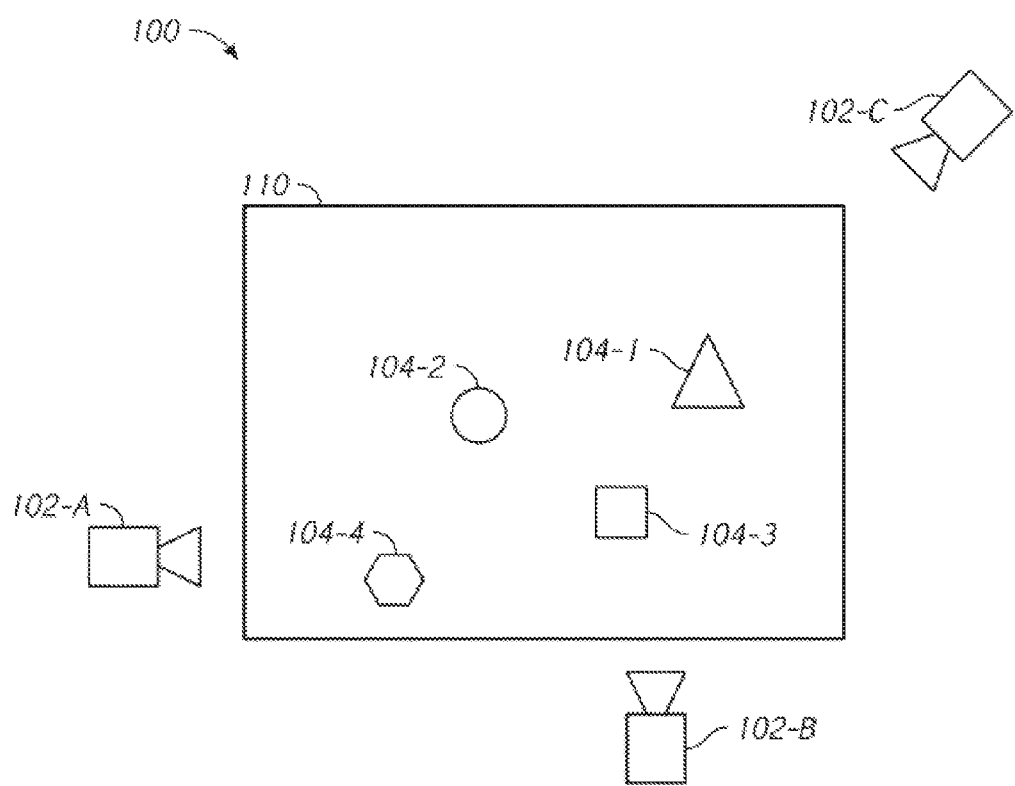
FIG. 1A is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include systems, methods, and devices for establishing correspondence between objects in a multi-image source environment. The method includes generating a set of candidate objects based at least in part on a set of image data, where the set of image data includes image data from a plurality of image sources. The method also includes generating a set of visual signatures, where each of the visual signatures in the set of visual signatures characterizes a candidate object in the set of candidate objects. The method further includes transforming at least two candidate objects in the set of candidate objects into a single object according to a determination that correspondence between visual signatures for the at least two candidate objects satisfies one or more correspondence criteria.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes:

one or more processors, a non-transitory memory, and means for performing or causing performance of any of the methods described herein.

EXAMPLE EMBODIMENTS

In general, prior methods for object tracking in multi-camera environments (e.g., Kalman filtering, particle filtering, probabilistic occupancy maps, and Bayesian inference and belief networks) build upon earlier decisions of object correspondence in the form of system states or prior probability distributions. As a result, a previously erroneous decision can strongly influence future decisions and induce further errors.

Instead, in various implementations, a method of addressing the object correspondence problem includes (e.g., given a collection of candidate object signatures identified per frame, per camera) clustering and generating similarity scores between visual signatures of candidate objects to flexibly incorporate various modes of constraints such as geometric consistency, motion consistency, visual similarity, and/or the like. In contrast to the prior methods, the proposed method treats input information (e.g., a matrix of similarity scores between all candidate objects in all consecutive video frames and all camera views) in the same manner along both temporal and spatial dimensions. As a result, the various implementations described herein propose a stateless method of establishing correspondence, which is less prone to error/mistake propagation. Moreover, the proposed method is also resistant to momentary, occasional errors introduced by imperfections in blob/candidate object detection, partially occluded views, injection of spurious frames, and/or the like.

Various implementations of the method more generally do not rely on any specific geometric constraints (e.g., the need of the presence of a ground plane in the scene). Furthermore, the proposed method is more flexible in that it can be applied to establish object correspondence for objects within the same camera view (e.g., along the temporal dimension), across all camera views bearing the same timestamp (e.g., along the spatial dimension), or jointly (e.g., the temporal and spatial dimensions) across a collection of camera views within a given time window (e.g., spanning over 5 seconds, for all cameras).

FIG. 1A is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes: capture devices 102-A, 102-B, and 102-C (collectively referred to as "capture devices 102" herein) (e.g., image and/or video sources); a scene 110 covered by the capture devices 102; and objects 104-1, 104-2, 104-3, and 104-4 (collectively referred to as "objects 104" herein) within the scene 110. As will be appreciated by one of ordinary skill in the art, the operating environment 100, as shown in FIG. 1, is a multi-image source environment with an arbitrary number of capture devices 102 and also an arbitrary number of objects 104. In one example, the scene 110 is at least a portion of the floor of a warehouse, and the objects 104 are workers, boxes, equipment, and/or the like. In another example, the scene 110 is at least a portion of the floor of a grocery or department store, and the objects 104 are shoppers, merchandise, shopping carts, and/or the like.

In some implementations, the capture devices 102 are image sources that capture image data (e.g., images, still frames from video, or video) according to a predefined schedule. For example, the capture devices 102 capture one image every 0.1, 0.25, 05, 1, 5, 10, etc. seconds. In another example, the capture devices 102 capture a 1, 2, 10, etc. second video clip every 30, 60, 90, etc. seconds. In some implementations, the capture devices 102 are video sources that continuously capture image data (e.g., stop motion images, still frames, or video stream data) according to a predefined frame rate (e.g., 24, 30, 48, 60, 72, 144, 300, etc. frames per second). The capture devices 102 have different positions relative to the scene 110 and different tilt, pan, and zoom parameters. As such, the capture devices 102 have differing fields of view of the scene 110 with different perspectives. According to some implementations, each of the capture devices 102 has a field of view that covers at least a portion of the scene 110. For the sake of simplicity, the operating environment 100 is illustrated in two dimensions. However, as will be appreciated by one of ordinary skill in the art, in reality, the operating environment 100 is three-dimensional with proper depth.

Figure 1B:
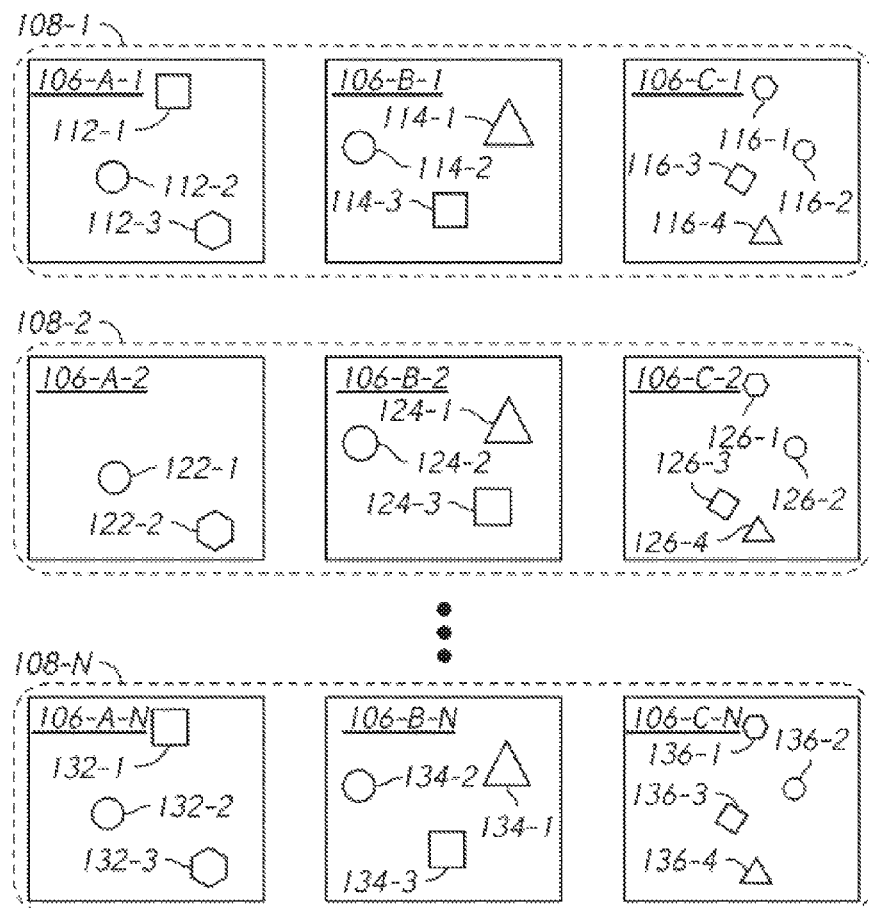
FIG. 1B is a representation of a plurality of example sets of image data associated with the operating environment in FIG. 1A in accordance with some implementations.

FIG. 1B is a representation of a plurality of example sets of image data 108 associated with the operating environment 100 in FIG. 1A in accordance with some implementations. As shown in FIG. 1B, as a non-limiting example, a first set of image data 108-1 includes images (e.g., frames) from each of the capture devices 102 (e.g., video sources) for a first time period, a second set of image data 108-2 includes images (e.g., frames) from each of the capture devices 102 (e.g., video sources) for a second time period, and an N-th set of image data 108-N includes images (e.g., frames) from each of the capture devices 102 (e.g., video sources) for an N-th time period. As such, for example, the frames 106-A-1, 106-B-1, and 106-C-1 in the first set of image data 108-1 were captured by the capture devices 102 at a same instant in time. In another example, the frames 106-A-1, 106-B-1, and 106-C-1 in the first set of image data 108-1 were sampled from video stream data from the capture devices 102 at a same instant in time.

As shown in FIG. 1B, for example, the first set of image data 108-1 includes a frame 106-A-1 from the capture device 102-A, a frame 106-B-1 from the capture device 102-B, and a frame 106-C-1 from the capture device 102-C. The frame 106-A-1 includes candidate objects 112-1, 112-2, and 112-3 corresponding to the objects 104-3, 104-2, and 104-4, respectively, in the scene 110. The frame 106-B-1 includes candidate objects 114-1, 114-2, and 114-3 corresponding to the objects 104-1, 104-2, and 104-3, respectively, in the scene 110. The frame 106-C-1 includes candidate objects 116-1, 116-2, 116-3, and 116-4 corresponding to the objects 104-4, 104-2, 104-3, and 104-1, respectively, in the scene 110.

As shown in FIG. 1B, for example, the second set of image data 108-2 includes a frame 106-A-2 from the capture device 102-A, a frame 106-B-2 from the capture device 102-B, and a frame 106-C-2 from the capture device 102-C. The frame 106-A-2 includes candidate objects 122-1 and 122-2 corresponding to the objects 104-2 and 104-4, respectively, in the scene 110. For example, the object 104-3 moved or was occluded between frames 106-A-1 and 106-A-2. The frame 106-B-2 includes candidate objects 124-1, 124-2, and 124-3 corresponding to the objects 104-1, 104-2, and 104-3, respectively, in the scene 110. For example, the object 104-3 moved between frames 106-B-1 and 106-B-2. The frame 106-C-2 includes candidate objects 126-1, 126-2, 126-3, and 126-4 corresponding to the objects 104-4, 104-2, 104-3, and 104-1, respectively, in the scene 110. For example, the object 104-3 moved between frames 106-C-1 and 106-C-2.

As shown in FIG. 1B, for example, the N-th set of image data 108-N includes a frame 106-A-N from the capture device 102-A, a frame 106-B-N from the capture device 102-B, and a frame 106-C-N from the capture device 102-C. The frame 106-A-N includes candidate objects 132-1, 132-2, and 132-3 corresponding to the objects 104-3, 104-2, and 104-4, respectively, in the scene 110. The frame 106-B-N includes candidate objects 134-1, 134-2, and 134-3 corresponding to the objects 104-1, 104-2, and 104-3, respectively, in the scene 110. The frame 106-C-N includes candidate objects 136-1, 136-2, 136-3, and 136-4 corresponding to the objects 104-4, 104-2, 104-3, and 104-1, respectively, in the scene 110.

FIG. 2A is a representation of a first instance of a correspondence matrix 200-A in accordance with some implementations. Elements common to FIGS. 1B and 2A include common reference numbers. As shown in FIG. 2A, as a non-limiting example, the correspondence matrix 200-A shows similarity scores for pairings of visual signatures for candidate objects identified in the first set of image data 108-1 in FIG. 1B.

According to some implementations, a visual signature is generated for each of the candidate objects identified in the first set of image data 108-1, as will be discussed in greater detail with reference to FIGS. 6 and 7A-7B. For example, a visual signature for representative candidate object 112-1 in the frame 106-A-1 characterizes the representative candidate object 112-1 (e.g., a unique visual characterization identity). In some implementations, the visual signature is a function of one or more attributes of representative candidate object 112-1, which include at least one of a color histogram of representative candidate object 112-1, a geometric signature for representative candidate object 112-1, a texture signature for representative candidate object 112-1, a motion vector for representative candidate object 112-1, and a feature profile associated with one or more features of representative candidate object 112-1.

According to some implementations, a similarity score is generated for each potential pair of visual signatures associated with the candidate objects identified in the first set of image data 108-1 by comparing the pair of visual signatures, as will be discussed in greater detail with reference to FIGS. 6 and 7A-7B. For example, representative pairing 210, which corresponds to the visual signatures for candidate object (CO) 112-1 within the frame 106-A-1 and the CO 116-3 within the frame 106-C-1, has a similarity score 220 of 0.7. In another example, representative pairing 212, which corresponds to the visual signatures for the CO 114-2 within the frame 106-B-1 and the CO 116-2 within the frame 106-C-1, has a similarity score 222 of 0.9.

According to some implementations, two visual signatures are merged and the corresponding candidate objects are transformed into (or identified as) a same object according to a determination that the similarity score for the pairing of those two visual signatures breaches a correspondence threshold (e.g., a similarity score ≥0.9), as will be discussed in greater detail with reference to FIGS. 6 and 7A-7B. In the first example above, the similarity score 220 for representative pairing 210 fails to breach the correspondence threshold (e.g., a similarity score ≥0.9). As such, the visual signatures corresponding to the CO 112-1 and the CO 116-3 are not merged, and the CO 112-1 and the CO 116-3 are not transformed into (or identified as) the same object. In other words, the similarity score 220 between the CO 112-1 and the CO 116-3 is not high enough to determine that they are the same object spotted in frames (e.g., frames 106-A-1 and 106-C-1) from two different video sources (e.g., capture devices 102-A and 102-C). As such, there is not correspondence along the spatial dimension for the CO 112-1 and the CO 116-3 in frames 106-A-1 and 106-C-1.

In the second example above, the similarity score 222 for representative pairing 212 breaches the correspondence threshold (e.g., a similarity score ≥0.9). As such, the visual signatures corresponding to the CO 114-2 and the CO 116-2 are merged, and the CO 114-2 and the CO 116-2 are transformed into (or identified as) the same object (e.g., the object 104-2 in the scene 110). In other words, the similarity score 222 between the CO 114-2 and the CO 116-2 is high enough to determine that they are the same object 104-2 spotted in frames (e.g., frames 106-B-1 and 106-C-1) from two different video sources (e.g., capture devices 102-B and 102-C). In other words, there is object similarity for the object 104-2 across two video sources (e.g., the capture devices 102-B and 102-C). As such, there is correspondence along the spatial dimension for the CO 114-2 and the CO 116-2 in frames 106-B-1 and 106-C-1.

Figure 2B:
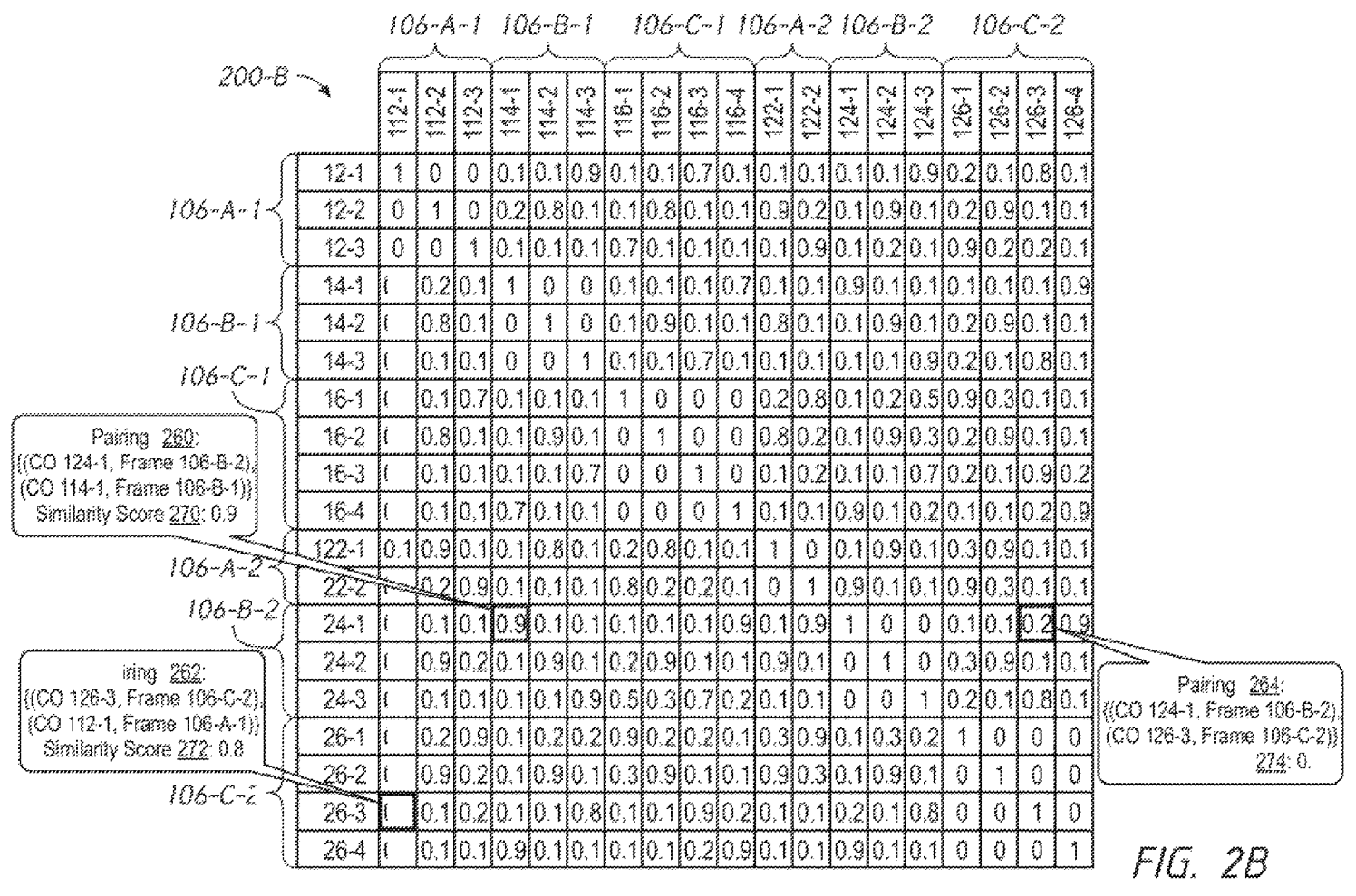

FIG. 2B is a representation of a second instance of a correspondence matrix 200-B in accordance with some implementations. Elements common to FIGS. 1B, 2A, and 2B include common reference numbers. Furthermore, the correspondence matrix 200-B in FIG. 2B is similar to and adapted from the correspondence matrix 200-A in FIG. 2A. As such, only the differences between FIGS. 2A and 2B are described herein for the sake of brevity. As shown in FIG. 2B, as a non-limiting example, the correspondence matrix 200-B shows similarity scores for pairings between visual signatures of candidate objects identified in the first set of image data 108-1 and/or the second set of image data 108-2 in FIG. 1B.

For example, representative pairing 260, which corresponds to the visual signatures for candidate object (CO) 124-1 within the frame 106-B-2 and the CO 114-1 within the frame 106-B-1, has a similarity score 270 of 0.9. In this example, the similarity score 270 for representative pairing 260 breaches the correspondence threshold (e.g., a similarity score ≥0.9). As such, the visual signatures corresponding to the CO 124-1 and the CO 114-1 are merged, and the CO 124-1 and the CO 114-1 are transformed into (or identified as) the same object (e.g., the object 104-1 in the scene 110). As such, the similarity score 270 between the CO 124-1 and the CO 114-1 is high enough to determine that they are the same object (e.g., object 104-1) spotted in frames (e.g., frames 106-B-2 and 106-B-1) corresponding to two different time periods (e.g., the second time period and the first time period, respectively) from the same video source (e.g., capture device 102-B). In other words, there is correspondence along the temporal dimension for the CO 124-1 and the CO 114-1 in frames 106-B-2 and 106-B-1.

In another example, representative pairing 262, which corresponds to the visual signatures for the CO 126-3 within the frame 106-C-2 and the CO 112-1 within the frame 106-A-1, has a similarity score 272 of 0.8. In this example, the similarity score 272 for representative pairing 262 fails to breach the correspondence threshold (e.g., a similarity score ≥0.9). As such, the visual signature corresponding to the CO 126-3 and the CO 112-1 are not merged, and the CO 126-3 and the CO 112-1 are not transformed into (or identified as) the same object. In other words, the similarity score 272 between the CO 126-3 and CO 112-1 is not high enough to determine that they are the same object spotted in frames (e.g., frames 106-C-2 and 106-A-1) corresponding to two different time periods (e.g., the second time period and the first time period, respectively) from two different video sources (e.g., capture devices 102-C and 102-A). In other words, there is neither correspondence along the temporal dimension nor the spatial dimension for the CO 126-3 and the CO 112-1 in frames 106-C-2 and 106-A-1.

In yet another example, representative pairing 264, which corresponds to the visual signatures for the CO 124-1 within the frame 106-B-2 and the CO 126-3 within the frame 106-C-2, has a similarity score 274 of 0.2. In this example, the similarity score 274 for representative pairing 264 fails to breach the correspondence threshold (e.g., a similarity score ≥0.9). As such, the visual signatures corresponding to the CO 124-1 and CO 126-3 are not merged, and the CO 124-1 and CO 126-3 are not transformed into (or identified as) the same object. In other words, the similarity score 272 between the CO 124-1 and the CO 126-3 is not high enough to determine that they are the same object spotted in frames (e.g., frames 106-B-2 and 106-C-1) corresponding to a same time period (e.g., the second time period) from two different video sources (e.g., capture devices 102-B and 102-C). In other words, there is not correspondence along the spatial dimension for the CO 124-1 and the CO 126-3 in frames 106-B-2 and 106-C-1.

Figure 3:
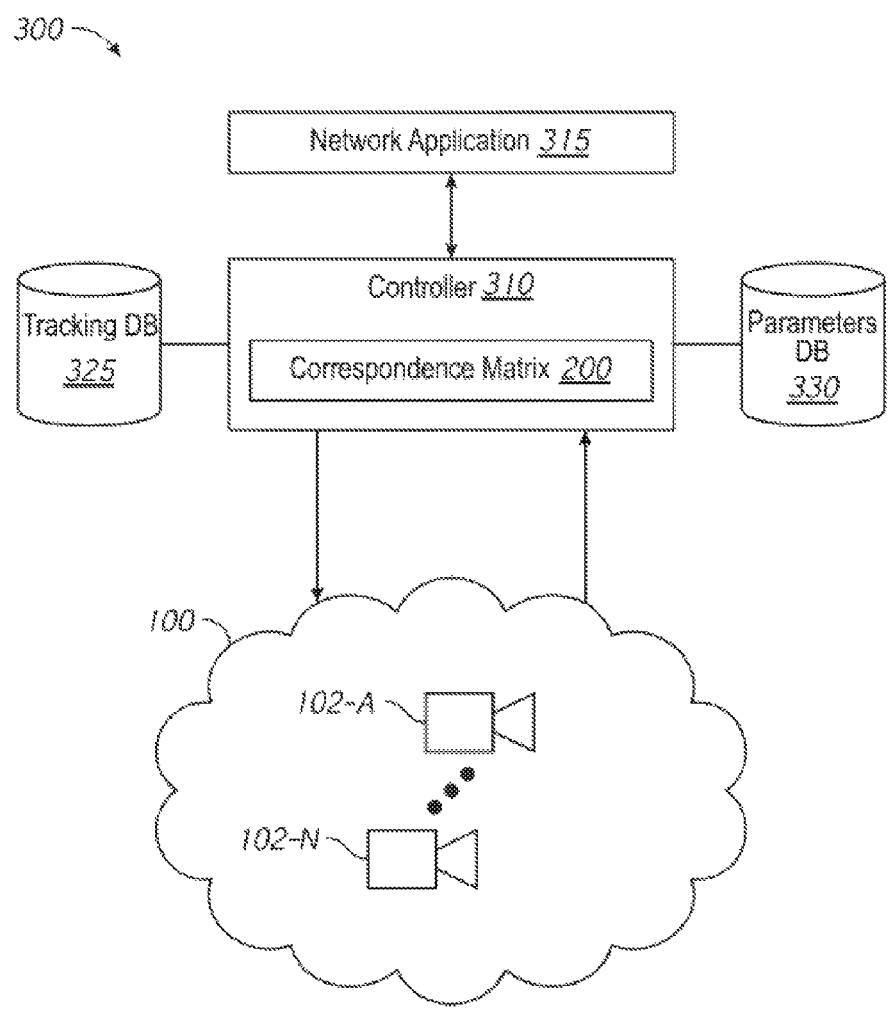
FIG. 3 is a block diagram of an example data processing network in accordance with some implementations.

FIG. 3 is a block diagram of an example data processing network 300 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. Elements common to FIGS. 1A and 3 include common reference numbers. To that end, as a non-limiting example, the data processing network 300 includes a controller 310, a network application 315, a tracking database 325, a parameters database 330, and the operating environment 100 with the capture devices 102.

In some implementations, the controller 310 controls the capture devices 102. For example, the controller 310 obtains image data from the capture devices 102 according to a predefined schedule (e.g., the first set of image data 108-1 for a first time period and the second set of image data for the second time period 0.25, 0.5, 1, 6, 12, 30, etc. seconds later). In another example, the controller 310 instructs the capture devices 310 to capture image data, and obtains the image data from the capture devices 102 in response to the instruction/request (e.g., the first set of image data 108-1 for a first time period).

In some implementations, the controller 310 maintains a correspondence matrix 200 (e.g., correspondence matrices 200-A or 200-B in FIGS. 2A and 2B, respectively) associated with image data from the capture devices 102 in order to establish object similarity across image data from different capture devices 102. According to some implementations, the controller 310 establishes correspondence between candidate objects in image data from different capture devices 102 (e.g., object similarity across image sources) based on the correspondence matrix 200. In some implementations, the correspondence matrix 200 compares X sets of images data (e.g., sets of frames) from X time periods. For example, the correspondence matrix 200 compares the two most recent sets of image data (e.g., the correspondence matrix 200-B in FIG. 2B). In another example, the correspondence matrix 200 compares an initial set of image data and a most recent set of image data. In yet another example, the correspondence matrix 200 compares sets of image data from the last 30 seconds. In some implementations, the controller 310 also tracks objects within the operating environment 100.

In some implementations, the network application 315 sets parameters for the controller 310 such as the predefined schedule for obtaining sets of image data and the tracking of objects. In some implementations, the network application 315 supplies instructions to the controller 310 such as an instruction to locate and/or track a specific object.

In some implementations, the tracking database 325 correlates identification information for an object (e.g., an identity code or serial number for an object) with characterization information associated with the object (e.g., a characterization profile, which is a function of one or more of a color histogram, feature profile, geometric profile, texture profile, etc. for the object) and tracking information associated with the location(s) of the object (e.g., sets of coordinates along with corresponding timestamps). The tracking database 325 is described in more detail herein with reference to FIG. 5.

In some implementations, the parameters database 330 stores positions for the capture devices 102 (e.g., absolute coordinates or coordinates relative to the scene 110 or the operating environment 100). In some implementations, the parameters database 330 also stores settings for the capture devices 102 such as tilt, pan, and zoom parameters associated with the capture devices 102.

Figure 4:
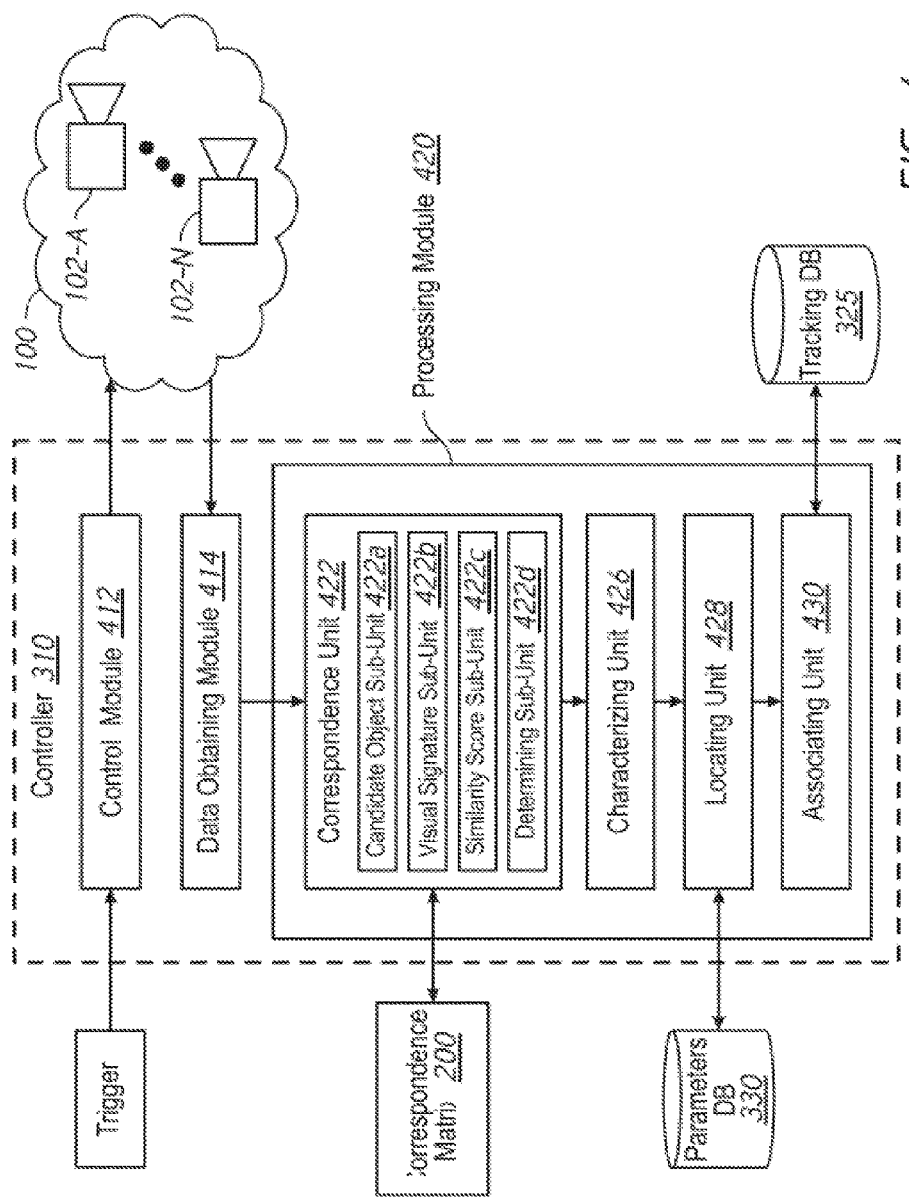
FIG. 4 is a block diagram of a portion of the data processing network in FIG. 3 in accordance with some implementations.

FIG. 4 is a block diagram of a portion of data processing network 300 in FIG. 3 in accordance with some implementations. Elements common to FIGS. 3 and 4 include common reference numbers, and only the differences between FIGS. 3 and 4 are described herein for the sake of brevity. To that end, the data processing network 300 includes the controller 310, the tracking database 325, the parameters database 330, and the operating environment 100 with the capture devices 102. According to some implementations, the controller 310 includes a control module 412, a data obtaining module 414, and a processing module 420.

In some implementations, the control module 412 controls the operation of the capture devices 102. For example, the control module 412 issues a request to the capture devices 102 to capture image data in response to a trigger (e.g., a request from an outside source or a predefined schedule for establishing object similarity across image sources). In some implementations, the data obtaining module 414 obtains image data from the capture devices 102. In one example, the data obtaining module 414 obtains (e.g., retrieves or receives) image data from each of the capture devices 102 according to a predefined schedule (e.g., every 60, 90, 120, etc. seconds). In another example, the data obtaining module 414 receives image data from each of the capture devices 102 in response to a request for images from the control module 412.

In some implementations, the processing module 420 establishes object similarity across image data from different capture devices 102 within the operating environment 100 and tracks objects within the operating environment 100. In some implementations, the processing module 420 includes a correspondence unit 422, a characterizing unit 426, a locating unit 428, and an associating unit 430.

In some implementations, the correspondence unit 422 establishes correspondence between at least two candidate objects in image data from different capture devices 102 (e.g., object similarity across image sources) based on the correspondence matrix 200 by transforming the at least two candidate objects into a single object. In some implementations, the correspondence unit 422 includes a candidate object sub-unit 422*a*, a visual signature sub-unit 422*b*, a similarity score sub-unit 422*c*, and a determining sub-unit 422*d*. The correspondence unit 422 is described in greater detail below with reference to FIGS. 6 and 7A-7B.

In some implementations, the characterizing unit 426 synthesizes a composite characterization profile for the single object based at least in part on visual signatures that correspond to the at least two candidate objects. The characterizing unit 426 is described in greater detail below with reference to FIGS. 6 and 7A-7B.

In some implementations, the locating unit 428 determines a location for the single object based on position of the at least two candidate objects in the image data using one or more known localization techniques and the location of the capture devices 102. The locating unit 428 is described in greater detail below with reference to FIGS. 6 and 7A-7B.

In some implementations, the associating unit 430 associates the location of the single object determined by the locating unit 428 with the composite characterization profile synthesized by the characterizing unit 426 in the tracking database 325. The associating unit 430 is described in greater detail below with reference to FIGS. 6 and 7A-7B.

Figure 5:
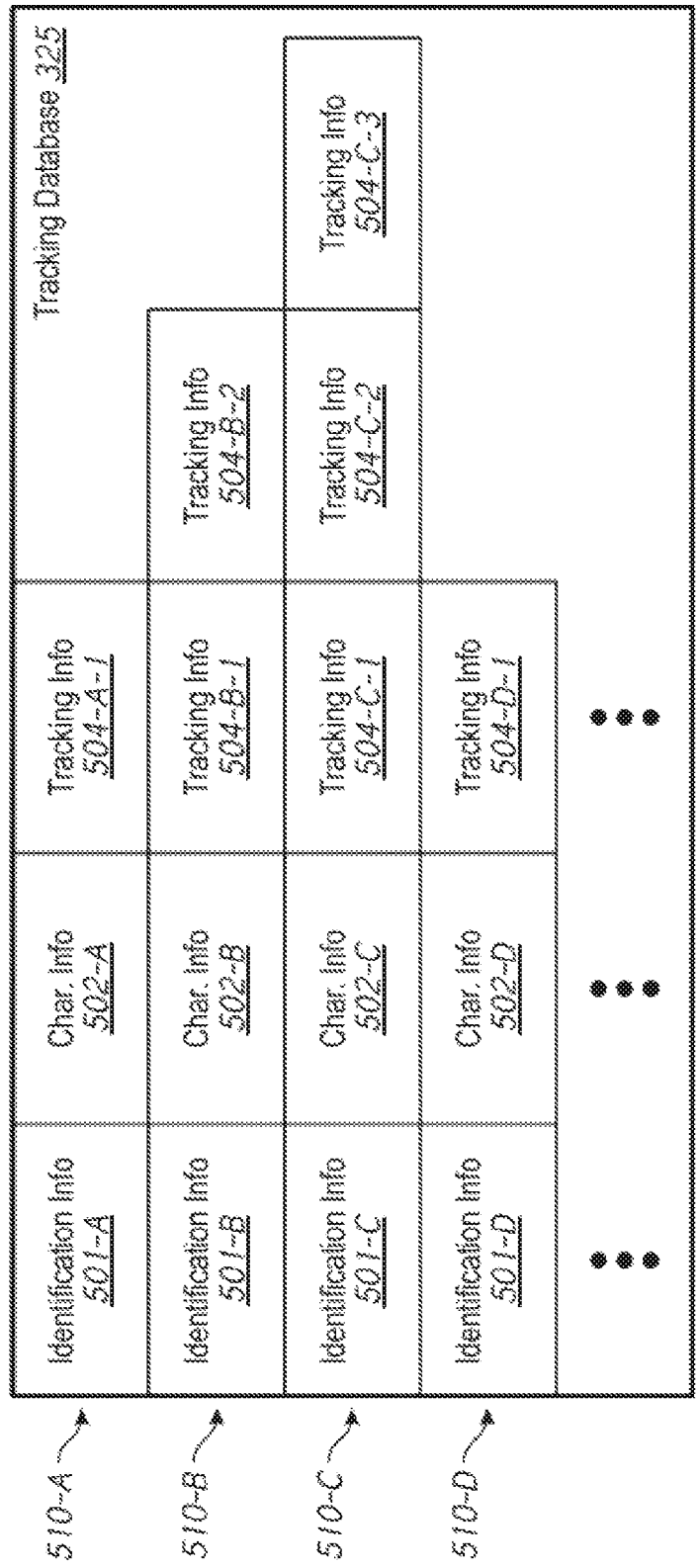
FIG. 5 is a block diagram of an example data structure for a tracking database in accordance with some implementations.

FIG. 5 is a block diagram of an example data structure for a tracking database 325 in accordance with some implementations. According to some implementations, the tracking database 325 includes a plurality of entries 510-A, 510-B, 510-C, 510-D, . . . (collectively referred to as "entries 510" herein), each of which corresponds to a unique object. In some implementations, the tracking database 325 is populated, updated, and maintained by the controller 310 or a component thereof (e.g., the associating unit 430 in FIG. 4). As shown in FIG. 5, each entry 510 of the characterization database 325 is characterized by the following fields: identification information 501, characterization information 502, and one or more instances of tracking information 504.

According to some implementations, the identification information 501-A includes a unique identity code or serial number for the object that corresponds to the row 510-A. In some implementations, the characterization information 502-A includes information that characterizes the object that corresponds to the row 510-A such as a characterization profile for the object. In some implementations, the characterization profile is a function of one or more attributes, which include a color histogram, a feature profile associated with one or more features, a geometric signature, a texture signature, a motion vector, and/or the like for the object. In some implementations, the location information 502-A-1 includes a timestamp and a set of coordinates (e.g., absolute coordinates or coordinates relative to the scene 110) associated with an instance that the object that corresponds to the row 510-A was located by the controller 310.

For example, the entry 510-A is associated with one instance of tracking information 504-A-1 because the object associated with the entry 510-A has been located by the controller 310 one time. In another example, the entry 510-B is associated with two instances of tracking information: tracking information 504-B-1 and tracking information 504-B-2. Continuing with this example, the tracking information 504-B-1 is associated with a first instance that the object associated with the entry 510-B was located by the controller 310 (e.g., time T), and the tracking information 504-B-2 is associated with a second instance that the object associated with the entry 510-B was located by the controller 310 (e.g., time T+1).

Figure 6:
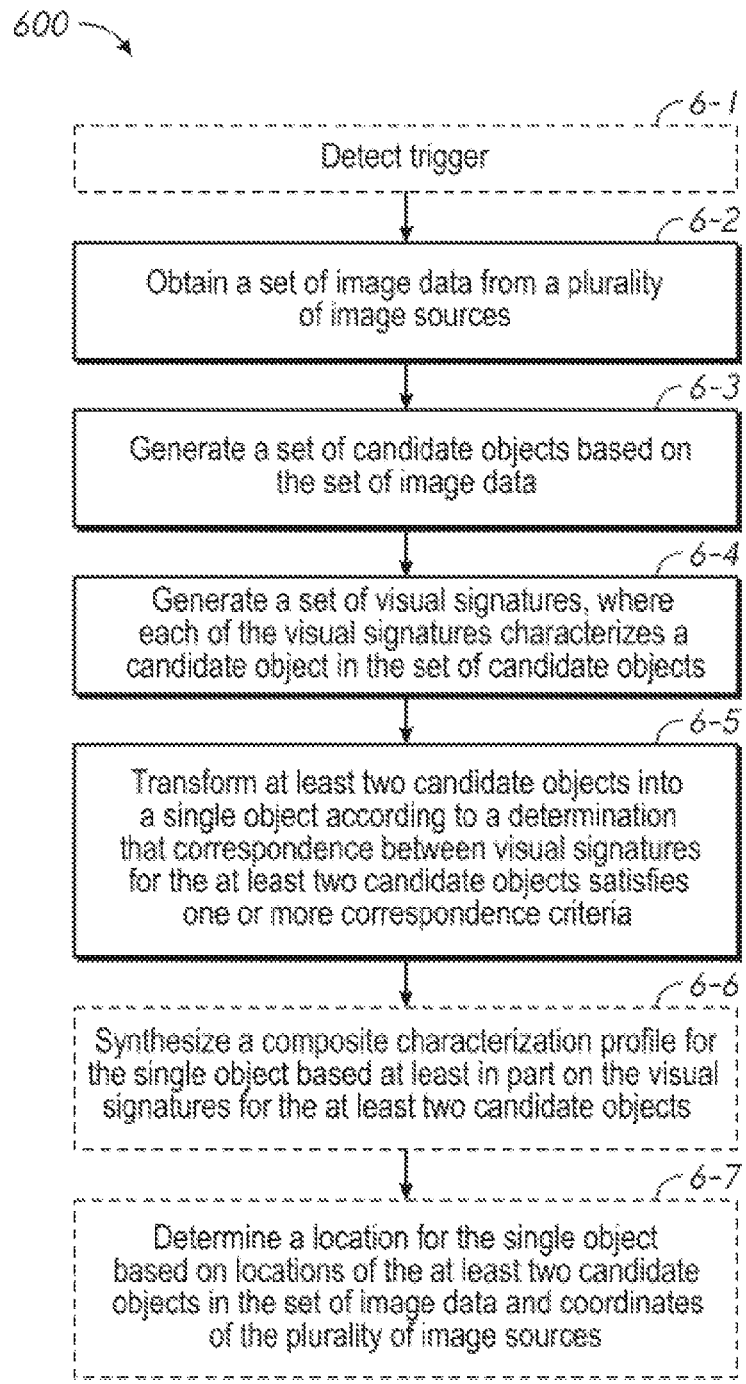
FIG. 6 is a flowchart representation of a method of establishing correspondence between objects in a multi-image source environment in accordance with some implementations.

FIG. 6 is a flowchart representation of a method 600 of establishing correspondence between objects in a multi-image source environment in accordance with some implementations. In various implementations, the method 600 is performed by a controller (e.g., the controller 310 in FIGS. 3 and 4). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 600 includes: obtaining a set of image data from a plurality of image sources; generating a set of candidate objects based at least in part on the set of image data; generating a set of visual signatures; and transforming at least two candidate objects in the set of candidate objects into a single object according to a determination that correspondence between visual signatures for the at least two candidate objects satisfies one or more correspondence criteria.

In some implementations, as represented by block 6-1, the method 600 optionally includes detecting a trigger. For example, with reference to FIG. 4, the controller 310 or a component thereof (e.g., the control module 412) obtains a trigger to perform the method 600. For example, the trigger is a request from a requestor (e.g., the network application 315 in FIG. 3) for a location of a specified object within the operating environment 100. In another example, the trigger is a predefined schedule for establishing object similarity or updating the locations of objects within the scene 110. In some implementations, in response to obtaining the trigger, the controller 210 or a component thereof (e.g., the control module 412) instructs each of the capture devices 102 to capture at least one image. In some implementations, each of the capture devices 102 captures an image of at least a portion of the scene 110 in response to the instruction. In some implementations, each of the capture devices 102 captures a video clip (e.g., 0.25, 0.5, 1, 5, etc. seconds in length) in response to the instruction.

In some implementations, each of the capture devices 102 captures at least one image of at least a portion of the scene 110 according to a predefined schedule (e.g., every 30, 90, 120, etc. seconds). In some implementations, each of the capture devices 102 captures a video clip (e.g., 0.25, 0.5, 1, 5, etc. seconds in length) according to a predefined schedule (e.g., every 30, 90, 120, etc. seconds). In some implementations, each of the capture devices 102 provides video stream data to the controller 310 that corresponds to at least a portion of the scene 110. In some implementations, the video stream data from the capture devices 102 has a same frame rate (e.g., 24, 30, 48, 60, 72, 144, 300, etc. frames per second). In some implementations, the capture devices 102 have varying fields of view and/or perspectives of the scene 110. In some implementations, the capture devices 102 are not co-located.

In some implementations, as represented by block 6-2, the method 600 optionally includes obtaining a set of image data from a plurality of image sources. For example, with reference to FIG. 4, the controller 310 or a component thereof (e.g., the data obtaining module 414) obtains (e.g., receives or retrieves) a set of image data from the capture devices 102. In one example, the set of image data includes a plurality of images captured at a same time, where each of the plurality of images is captured by a different one of the capture devices 102 (e.g., image sources). In another example, the set of image data includes a plurality of frames captured at a same time, where each of the plurality of frames is captured by a different one of the capture devices 102 (e.g., video sources). In one example, the set of image data includes a first subset of images captured at a first time and a second subset of images captured at a second time, where each of the images in the first and second subsets is captured by a different one of the capture devices 102 (e.g., image sources).

As represented by block 6-3, the method 600 includes generating a set of candidate objects based at least in part on the set of image data. For example, with reference to FIG. 4, the controller 310 or a component thereof (e.g., the candidate object sub-unit 422a) generates a set of candidate objects based on the set of image data. In some implementations, the set of candidate objects are identified within the set of image data via background subtraction, feature detection, blob detection, and/or the like.

As represented by block 6-4, the method 600 includes generating a set of visual signatures, where each of the visual signatures characterizes a candidate object in the set of candidate objects. For example, with reference to FIG. 4, the controller 310 or a component thereof (e.g., the visual signature sub-unit 422b) generates a set of visual signatures including a visual signature for each one of set of candidate objects. In some implementations, each of the visual signatures characterizes a corresponding candidate object. In some implementations, a visual signature is a function of one or more attributes, which includes a feature profile of one or more features, a color histogram, a texture signature, a geometric signature, a motion vector, and/or the like for the candidate object. In some implementations, the visual characterization signature is a function of bag-of-words (BoW) for features from performing feature extraction associated with the candidate objects. In some implementations, the visual characterization signature is the result of a clustering algorithm associated with features of the candidate object.

As represented by block 6-5, the method 600 includes transforming at least two candidate objects in the set of candidate objects into a single object according to a determination that correspondence between visual signatures for the at least two candidate objects satisfies one or more correspondence criteria. In some implementations, the one or more correspondence criteria are satisfied when the similarity score for the visual signatures associated with any two candidate objects breaches a predefined threshold. In some implementations, the one or more correspondence criteria are satisfied by the highest similarity score for the visual signatures associated with any two candidate objects among the set of candidate objects. In some implementations, the one or more correspondence criteria are satisfied according to the result of a clustering algorithm or the like.

In some implementations, the one or more correspondence criteria are satisfied when correspondence between visual signatures for the at least two candidate objects satisfies a correspondence threshold. As one example, the correspondence threshold for merging three candidate objects is higher than the correspondence threshold for merging two candidate objects. In some implementations, the correspondence threshold is a function of the set of candidate objects. As one example, the correspondence threshold depends on the number of candidate objects in the set of candidate objects.

For example, with reference to FIG. 4, the controller 310 or a component thereof (e.g., the determining sub-unit 422d) transforms at least two candidate objects in the set of candidate objects into a single object by establishing a threshold level of correspondence between the at least two candidate objects based in part on a similarity score, where the similarity score is a comparison between the visual signatures for the at least two candidate objects. As one example, with reference to FIG. 2A, representative pairing 212, which corresponds to the visual signatures for the candidate object (CO) 114-2 within the frame 106-B-1 and the CO 116-2 within the frame 106-C-1, has a similarity score 222 of 0.9. In this example, the similarity score 222 for representative pairing 212 breaches the correspondence threshold (e.g., a similarity score ≥0.9). As such, the visual signatures corresponding to the CO 114-2 and the CO 116-2 are merged, and the CO 114-2 and the CO 116-2 are transformed into (or identified as) the same object (e.g., the object 104-2 in the scene 110).

According to some implementations, a first one of the at least two candidate objects corresponds to image data from a first one of the plurality of image sources captured at a first time and a second one of the at least two candidate objects corresponds to image data from a second one of the plurality of image sources captured at the first time. In other words, in some implementations, spatial correspondence is established between candidate objects identified in image data captured at a same time by different image sources. For example, with reference to FIG. 2B, the representative pairing 264 corresponds to a pairing between a first visual signature of the candidate object (CO) 124-1 identified in the frame 106-B-2 captured by image source 102-B at a second time and a second visual signature of the CO 126-3 identified in the frame 106-C-2 captured by image source 102-C at the second time.

According to some implementations, a first one of the at least two candidate objects corresponds to image data from a first one of the plurality of image sources captured at a first time and a second one of the at least two candidate objects corresponds to image data from a second one of the plurality of image sources captured at a second time. In other words, in some implementations, spatial and temporal correspondence is established between candidate objects identified in image data captured at different times by different image sources. For example, with reference to FIG. 2B, the representative pairing 262 corresponds to a pairing between a first visual signature of the candidate object (CO) 126-3 identified in the frame 106-C-2 captured by the image source 102-C at a second time and a second visual signature of the CO 112-1 identified in the frame 106-A-1 captured by the image source 102-A at a first time.

According to some implementations, a first one of the at least two candidate objects corresponds to image data from a first one of the plurality of image sources captured at a first time and a second one of the at least two candidate objects corresponds to image data from the first one of the plurality of image sources captured at a second time. In other words, in some implementations, temporal correspondence is established between candidate objects identified in image data captured at different times by a same image source. For example, with reference to FIG. 2B, the representative pairing 260 corresponds to a pairing between a first visual signature of the candidate object (CO) 124-1 identified in the frame 106-B-2 captured by the image source 102-B at a second time and a second visual signature of the CO 114-1 identified in the frame 106-B-1 captured by the image source 102-B at a first time.

In some implementations, the method 600 determines that the at least two candidate objects are separate objects according to a determination that correspondence between the visual signatures for the at least two candidate objects does not satisfy the one or more correspondence criteria and continues to the block 6-1. In some implementations, the correspondence threshold is not satisfied when the similarity score for the visual signatures associated with the at least two candidate objects does not breach the predefined threshold.

As one example, with reference to FIG. 2A, the representative pairing 210, which corresponds to the visual signatures for the candidate object (CO) 112-1 within the frame 106-A-1 and the CO 116-3 within the frame 106-C-1, has a similarity score 220 of 0.7. In this example, the similarity score 220 for representative pairing 210 fails to breach the correspondence threshold (e.g., a similarity score ≥0.9). As such, the visual signatures corresponding to the CO 112-1 and the CO 116-3 are not merged, and the CO 112-1 and the CO 116-3 are not transformed into (or identified as) the same object.

In some implementations, as represented by block 6-6, the method 600 optionally includes synthesizing a composite characterization profile for the single object based at least in part on the visual signatures for the at least two candidate objects. For example, with reference to FIG. 4, the controller 310 or a component thereof (e.g., the characterizing unit 426) synthesizes a composite characterization profile for the single object based at least in part on the visual signatures for to the at least two candidate objects. In some implementations, the characterizing module 422 synthesizes the composite characterization profile by merging the visual signatures for the at least two candidate objects to obtain the composite characterization profile for the single object. In some implementations, the characterizing module 422 synthesizes the composite characterization profile by interpolating the visual signatures for the at least two candidate objects to obtain the composite characterization profile for the single object.

In some implementations, as represented by block 6-7, the method 600 optionally includes determining a location for the single object based at least in part on locations of the at least two candidate objects in the set of image data and coordinates associated with the at plurality of image sources. For example, with reference to FIG. 4, the controller 310 or a component thereof (e.g., the locating unit 428) determines a location for the single object based on the on locations of the at least two candidate objects in the set of image data and the locations of the plurality of image sources. In some implementations, the location of the single object is a set absolute coordinates or a set coordinates relative to the scene 110.

In some implementations, with reference to FIG. 4, the controller 310 or a component thereof (e.g., the locating unit 428) obtains coordinates for the plurality of image sources (e.g., the capture devices 102). For example, the coordinates are absolute (e.g., real world) coordinates. In another example, the coordinates are relative to the scene 110, a marker in the scene 110, a reference capture device among the capture devices 102, or the like. In some implementations, obtaining the coordinates includes requesting position data (e.g., coordinates) from the capture devices 102. In some implementations, obtaining the coordinates includes determining the coordinates based on fields of view of the capture devices 102 and the dimensions of the scene 110. In some implementations, obtaining the coordinates includes retrieving the coordinates from the parameters database 330. In some implementations, tilt, pan, zoom, etc. parameters for the capture devices 102 are also obtained from the parameters database 330.

In some implementations, the controller 310 or a component thereof (e.g., the processing module 420) determines whether the composite characterization profile for the single object matches a characterization profile for a previously characterized object within a predefined tolerance threshold. In accordance with a determination that the composite characterization profile matches a characterization profile for a previously characterized object, the controller 310 or a component thereof (e.g., the associating unit 430) associates the location of the single object with an existing entry in the tracking database 325. In other words, another instance of tracking information 504 (e.g., current coordinates along with a timestamp) is added to the entry 510 that corresponds to the previously characterized object. In accordance with a determination that the composite characterization profile does not match a characterization profile for a previously characterized object, the controller 310 or a component thereof (e.g., the associating unit 430) creates a new entry in the tracking database 325 for the single object. In other words, with reference to FIG. 5, the associating unit 430 creates a new entry 510 with a unique identification information 501 (e.g., an identity code or a serial number) for the single object, characterization information 502 including the composite characterization profile, and tracking information 504 including the location of the single object (e.g., coordinates) and a timestamp.

In some implementations, the controller 310 or a component thereof (e.g., the correspondence unit 422) updates the similarity score between the visual signatures associated with the at least two candidate object based at least in part on the determined location of the single object. For example, if the location is the same as a previous location of the single object, the similarity score is increased. However, in this example, if the location is different from as previous location of the single object, the similarity score is decreased. For example, the magnitude of the decrease is scaled according to the magnitude of the difference in location.

Figure 7A:
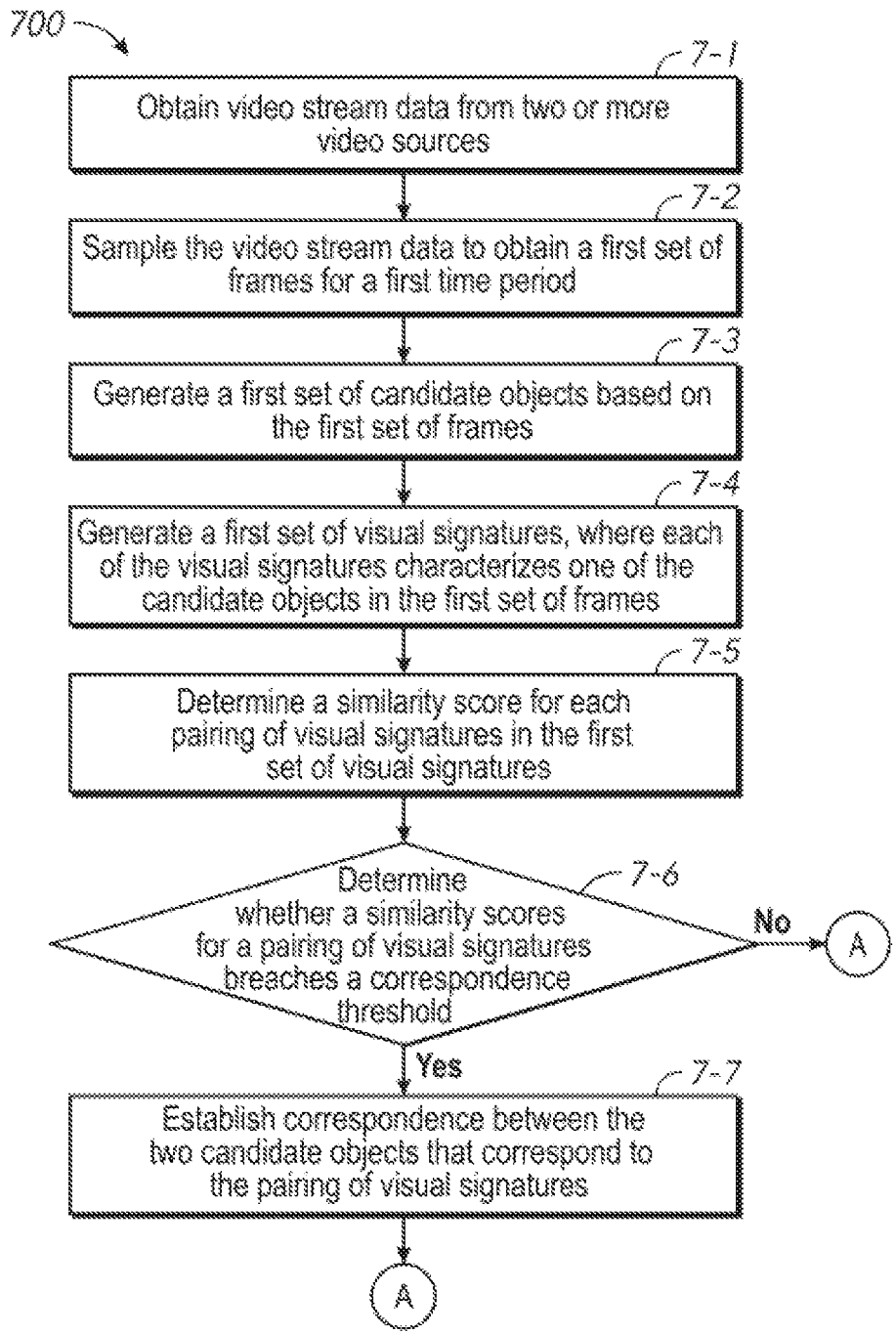
FIGS. 7A-7B show a flowchart representation of another method of establishing correspondence between objects in a multi-image source environment in with some implementations.
Figure 7B:
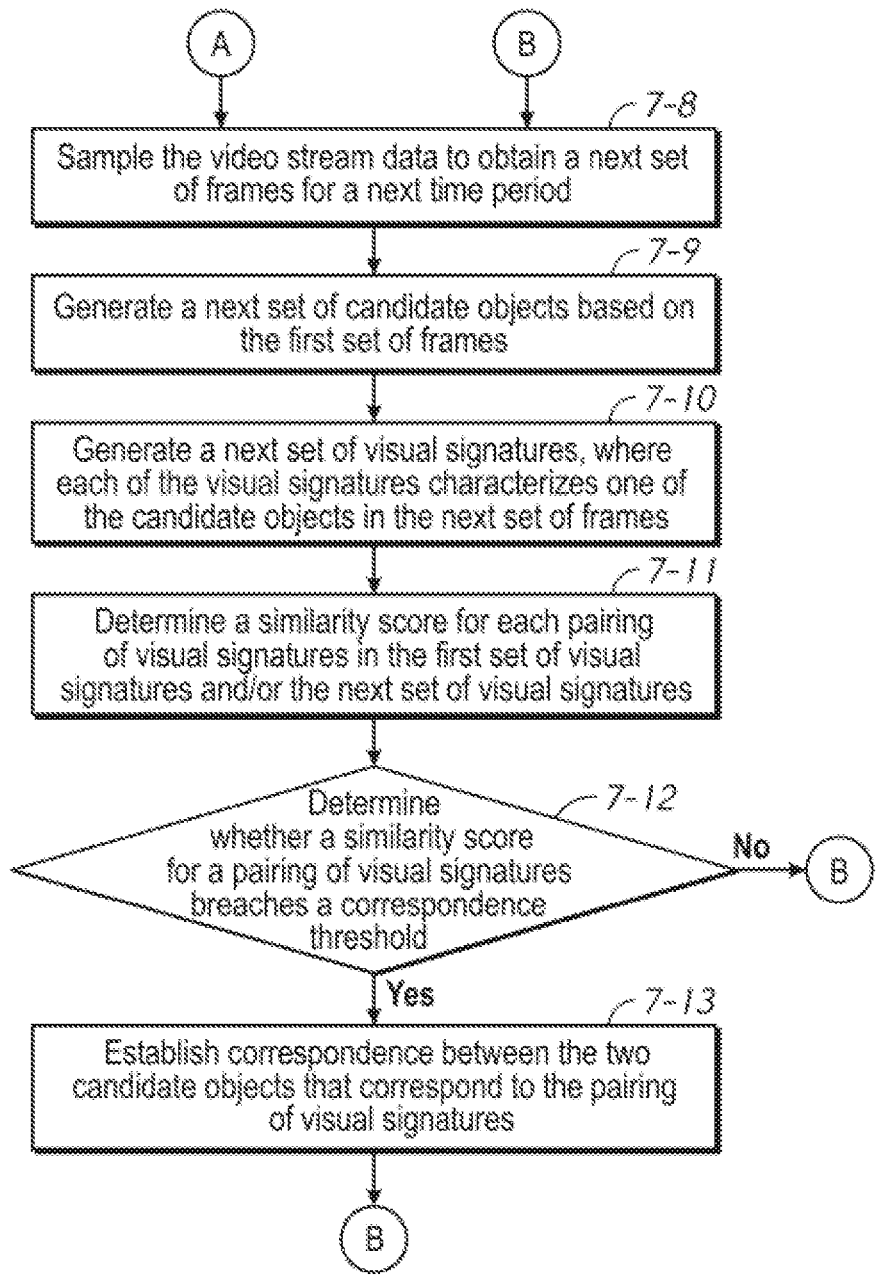

FIGS. 7A-7B show a flowchart representation of a method 700 of establishing correspondence between objects in a multi-image source environment in accordance with some implementations. In various implementations, the method 700 is performed by a controller (e.g., the controller 310 in FIGS. 3 and 4). While pertinent features are shown, those of ordinary skill in the art will appreciate from the present disclosure that various other features have not been illustrated for the sake of brevity and so as not to obscure more pertinent aspects of the example implementations disclosed herein.

As represented by block 7-1, the method includes obtaining video stream data from two or more video sources. For example, with reference to FIG. 4, the controller 310 or a component thereof (e.g., the data obtaining module 414) obtains (e.g., receives or retrieves) video stream data from the capture devices 102. In some implementations, the video stream data from the capture devices 102 has a same frame rate (e.g., 24, 30, 48, 60, 72, 144, 300, etc. frames per second).

As represented by block 7-2, the method 700 includes sampling the video stream data to obtain a first set of frames for a first time period. For example, with reference to FIG. 4, the controller 310 or a component thereof (e.g., the data obtaining module 414) samples the video stream data from the capture devices 102 to obtain a first set of frames for a first time period (e.g., at least one frame from each of the capture devices 102).

As represented by block 7-3, the method 700 includes generating a first set of candidate objects based on the first set of frames. According to some implementations, block 7-3 is similar to and adapted from block 6-3 in FIG. 6. As such, it will not be discussed again for the sake of brevity.

As represented by block 7-4, the method 700 includes generating a first set of visual signatures, where each of the visual signatures characterizes a candidate object in the first set of candidate objects. According to some implementations, block 7-4 is similar to and adapted from block 6-4 in FIG. 6. As such, it will not be discussed again for the sake of brevity.

As represented by block 7-5, the method 700 includes determining a similarity score for each pairing of visual signatures in the first set of visual signatures. In some implementations, similarity scores are determined for each n-tuple (e.g., set of 2, 3, 4, etc. visual signatures) of visual signatures in the first set of visual signatures. For example, with reference to FIG. 4, the controller 310 or a component thereof (e.g., the similarity score sub-unit 422c) determines a similarity score for each pairing of visual signatures in the first set of visual signatures. In some implementations, a similarity score is a confidence value for the degree of likeness between a first visual signature associated with a first candidate object and a second visual signature associated with a second candidate object. For example, if the visual signatures are identical, the similarity score is 1.0. In contrast, if visual signatures are divergent, the similarity score is 0.1.

As represented by block 7-6, the method 700 includes determining whether a similarity scores for a pairing of visual signatures breaches a correspondence threshold. For example, with reference to FIG. 4, the controller 310 or a component thereof (e.g., the determining sub-unit 422d) determines whether the similarity scores for each of the pairings of visual signatures in the first set of visual signatures breaches a correspondence threshold (e.g., a similarity score $\geq 0.9$).

For a similarity score of any of the pairings that breaches the correspondence threshold, the method 700 continues to block 7-7. If none of the similarity scores of the pairings breach the correspondence threshold, the method continues to block 7-8.

As represented by block 7-7, the method 700 includes establishing correspondence between the two candidate objects in the first set of candidate objects that correspond to the pairing of visual signatures by identifying the two candidate objects as a same object. For example, with reference to FIG. 4, the controller 310 or a component thereof (e.g., the determining sub-unit 422d) establishes correspondence between two candidate objects in the first set of candidate objects that correspond to the pairing with a similarity score that breached the correspondence threshold by identifying the two candidate objects as a same object.

In one example, with reference to FIG. 2A, the representative pairing 212, which corresponds to the visual signatures for the candidate object (CO) 114-2 within the frame 106-B-1 and the CO 116-2 within the frame 106-C-1, has a similarity score 222 of 0.9. In this example, the similarity score 222 for representative pairing 212 breaches the correspondence threshold (e.g., a similarity score $\geq 0.9$). As such, the visual signatures corresponding to the CO 114-2 and the CO 116-2 are merged, and the CO 114-2 and the CO 116-2 are transformed into (or identified as) the same object (e.g., the object 104-2 in the scene 110).

As represented by block 7-8, the method 700 includes sampling the video stream data to obtain a next set of frames for a next time period. For example, with reference to FIG. 4, the controller 310 or a component thereof (e.g., the data obtaining module 414) samples the video stream data from the capture devices 102 to obtain a next set of frames for a next time period (e.g., at least one frame from each of the capture devices 102).

As represented by block 7-9, the method 700 includes generating a next set of candidate objects based on the next set of frames. According to some implementations, block 7-9 is similar to and adapted from block 6-3 in FIG. 6. As such, it will not be discussed again for the sake of brevity.

As represented by block 7-10, the method 700 includes generating a next set of visual signatures, where each of the visual signatures in the next set of visual signatures characterizes a candidate object in the next set of candidate objects. According to some implementations, block 7-10 is similar to and adapted from block 6-4 in FIG. 6. As such, it will not be discussed again for the sake of brevity.

As represented by block 7-11, the method 700 includes determining a similarity score for each pairing of visual signatures in the first set of visual signatures and/or the next set of visual signatures. In some implementations, similarity scores are determined for each n-tuple (e.g., set of 2, 3, 4, etc. visual signatures) of visual signatures in the first set of visual signatures and/or the next set of visual signatures. For example, with reference to FIG. 4, the controller 310 or a component thereof (e.g., the similarity score sub-unit 422c) determines a similarity score for each pairing amongst pairs of visual signatures in the next set of visual signatures and/or the first set of visual signatures.

As represented by block 7-12, the method 700 includes determining whether a similarity score for a pairing of visual signatures breaches a correspondence threshold. For example, with reference to FIG. 4, the controller 310 or a component thereof (e.g., the determining sub-unit 422d) determines whether the similarity scores for each of the label pairings in the next set of label pairings breaches a correspondence threshold (e.g., a similarity score $\geq 0.9$).

For a similarity score of any pairing that breaches the correspondence threshold, the method 700 continues to block 7-13. If none of similarity scores of the pairings breach the correspondence threshold, the method continues to block 7-8.

As represented by block 7-13, the method 700 includes establishing correspondence between two candidate objects that correspond to the pairing of visual signatures by identifying the two candidate objects as a same object. In some implementations, a first one of the two candidate objects is included in the first set of candidate objects, and the other one of the two candidate objects is included in the next set of candidate objects. For example, with reference to FIG. 4, the controller 310 or a component thereof (e.g., the determining sub-unit 422d) establishes correspondence between two candidate objects that correspond to the pairing with a similarity score that breached the correspondence threshold by identifying the two candidate objects as a same object.

In one example, with reference to FIG. 2B, the representative pairing 260, which corresponds to the visual signatures for the candidate object (CO) 124-1 within the frame 106-B-2 and the CO 114-1 within the frame 106-B-1, has a similarity score 270 of 0.9. In this example, the similarity score 270 for representative pairing 260 breaches the correspondence threshold (e.g., a similarity score $\geq 0.9$). As such, the visual signatures corresponding to the CO 124-1 and the CO 114-1 are merged, and the CO 124-1 and the CO 114-1 are transformed into (or identified as) the same object (e.g., the object 104-1 in the scene 110). As such, the similarity score 270 between the CO 124-1 and the CO 114-1 is high enough to determine that they are the same object (e.g., object 104-1) spotted in frames (e.g., frames 106-B-2 and 106-B-1) corresponding to two different time periods (e.g., the second time period and the first time period, respectively) from the same video source (e.g., capture device 102-B).

In another example, with reference to FIG. 2B, the representative pairing 262, which corresponds to the visual signatures for the CO 126-3 within the frame 106-C-2 and the CO 112-1 within the frame 106-A-1, has a similarity score 272 of 0.8. In this example, the similarity score 272 for representative pairing 262 fails to breach the correspondence threshold (e.g., a similarity score ≥0.9). As such, the visual signatures corresponding to the CO 126-3 and the CO 112-1 are not merged, and the CO 126-3 and CO 112-1 are not transformed into (or identified as) the same object. In other words, the similarity score 272 between the CO 126-3 and the CO 112-1 is not high enough to determine that they are the same object spotted in frames (e.g., frames 106-C-2 and 106-A-1) corresponding to two different time periods (e.g., the second time period and the first time period, respectively) from two different video sources (e.g., capture devices 102-C and 102-A).

Figure 8:
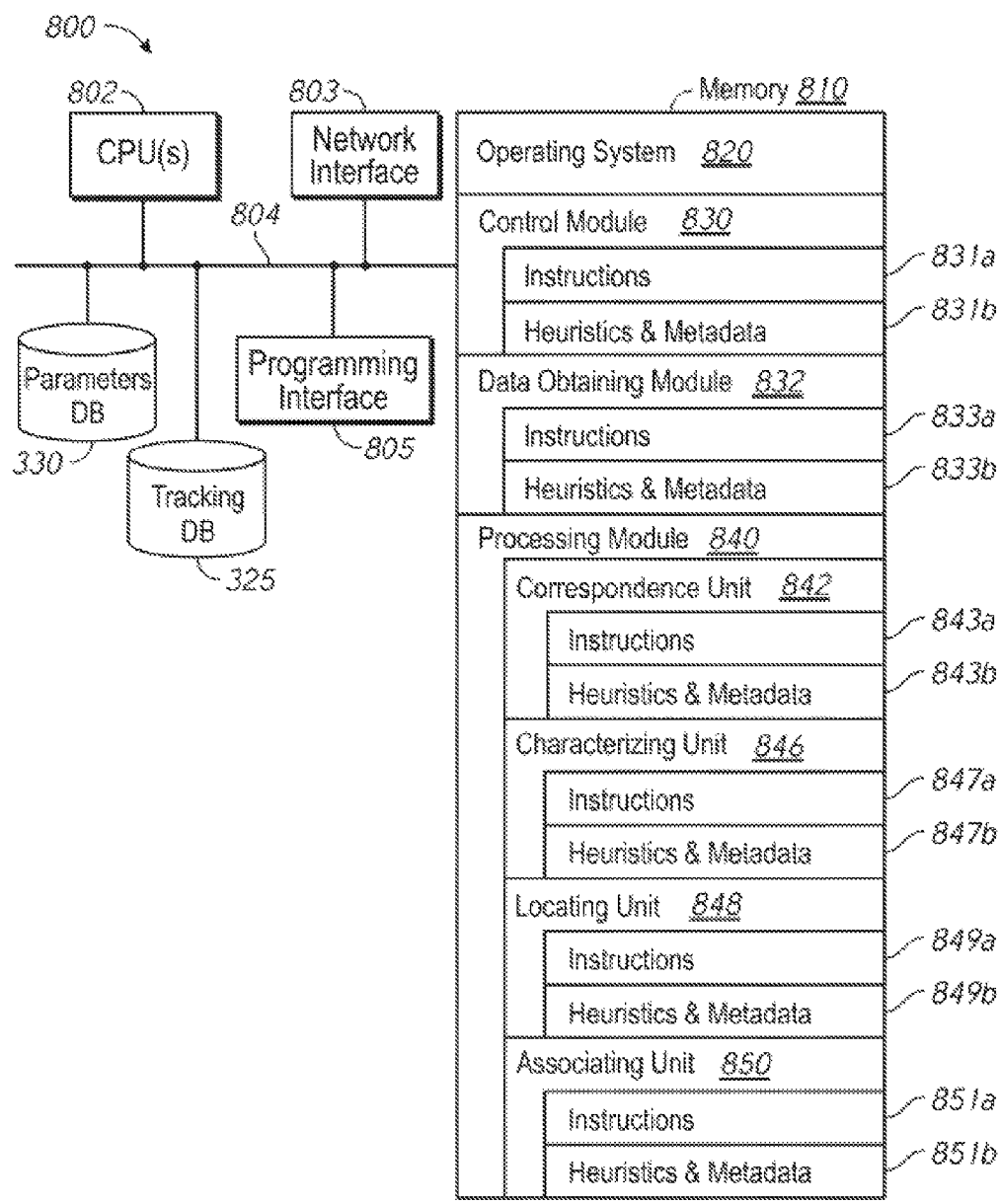
FIG. 8 is a block diagram of an example device in accordance with some implementations.

FIG. 8 is a block diagram of an example of a device 800 in accordance with some implementations. For example, in some implementations, the device 800 is similar to and adapted from the controller 310 in FIGS. 3 and 4. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 802, a network interface 803, a programming (I/O) interface 805, a memory 810, a tracking database 325, a parameters database 330, and one or more communication buses 804 for interconnecting these and various other components.

In some implementations, the one or more communication buses 804 include circuitry that interconnects and controls communications between system components. The tracking database 325 stores a plurality of entries each of which corresponds to a unique object. In some implementations, each entry of the tracking database 325 is characterized by following fields: identification information, characterization information, and one or more instances of location information. The tracking database 325 is described in more detail above with reference to FIG. 5. In some implementations, the parameters database 330 stores locations/positions for the capture devices 102 and settings for the capture devices 102 such as tilt, pan, and zoom parameters associated with the capture devices 102.

The memory 810 includes high-speed random access memory, such as DRAM, SRAM, DDR RAM, or other random access solid state memory devices. In some implementations, the memory 810 includes non-volatile memory, such as one or more magnetic disk storage devices, optical disk storage devices, flash memory devices, or other non-volatile solid state storage devices. The memory 810 optionally includes one or more storage devices remotely located from the one or more CPUs 802. The memory 810 comprises a non-transitory computer readable storage medium. In some implementations, the memory 810 or the non-transitory computer readable storage medium of the memory 810 stores the following programs, modules and data structures, or a subset thereof including an optional operating system 820, a control module 830, a data obtaining module 832, and a processing module 840.

The operating system 820 includes procedures for handling various basic system services and for performing hardware dependent tasks.

In some implementations, the control module 830 is configured to control the capture devices 102 within the operating environment 100. To that end, in various implementations, the control module 830 includes instructions and/or logic 831a, and heuristics and metadata 831b. According to some implementations, the control module 830 is similar to and adapted from the control module 412 in FIG. 4.

In some implementations, the data obtaining module 832 is configured to obtain image data from the capture devices 102. To that end, in various implementations, the data obtaining module 832 includes instructions and/or logic 833a, and heuristics and metadata 833b. According to some implementations, the data obtaining module 832 is similar to and adapted from the data obtaining module 414 in FIG. 4.

In some implementations, the processing module 840 is configured to establish object similarity across image data from different capture devices 102 within the operating environment 100. In some implementations, the processing module 840 is also configured to track objects within the operating environment 100. According to some implementations, the processing module 840 is similar to and adapted from the processing module 420 in FIG. 4. According to some implementations, the processing module 840 includes a correspondence unit 842, a characterizing unit 846, a locating unit 848, and an associating unit 840.

In some implementations, the correspondence unit 842 is configured to establish correspondence between at least two candidate objects in image data from different capture devices 102 (e.g., object similarity across image sources) based on the correspondence matrix 200 by transforming the at least two candidate objects into a single object. To that end, in various implementations, the correspondence unit 842 includes instructions and/or logic 843a, and heuristics and metadata 843b. According to some implementations, the correspondence unit 842 is similar to and adapted from the correspondence unit 422 in FIG. 4.

In some implementations, the characterizing unit 846 is configured to synthesize a composite characterization profile for the single object based at least in part on visual signatures that correspond to the at least two candidate objects. To that end, in various implementations, the characterizing unit 846, includes instructions and/or logic 847a, and heuristics and metadata 847b. According to some implementations, the characterizing unit 846, is similar to and adapted from the characterizing unit 426 in FIG. 4.

In some implementations, the locating unit 848 is configured to determine a location for the single object based on position of the at least two candidate objects in the image data and the positions of the capture devices 102. To that end, in various implementations, the locating unit 848 includes instructions and/or logic 849a, and heuristics and metadata 849b. According to some implementations, the locating unit 848 is similar to and adapted from the locating unit 428 in FIG. 4.

In some implementations, the associating unit 850 is configured to associate the location of the single object determined by the locating unit 848 with the composite characterization profile synthesized by the characterizing unit 846 in the tracking database 325. To that end, in various implementations, the associating unit 850 includes instructions and/or logic 851a, and heuristics and metadata 851b.

According to some implementations, the associating unit 850 is similar to and adapted from the associating unit 430 in FIG. 4.

Although the control module 830, the data obtaining module 832, and the processing module 840 are shown as residing on a single device (e.g., the device 800), it should be understood that in other implementations, any combination of the control module 830, the data obtaining module 832, and the processing module 840 reside in separate computing devices. For example, each of the control module 830, the data obtaining module 832, and the processing module 840 reside on a separate device.

Moreover, FIG. 8 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

In some implementations, the various modules of the device 800 include: means for generating a set of candidate objects based at least in part on a set of image data, where the set of image data includes image data from a plurality of image sources; means for generating a set of visual signatures, where each of the visual signatures in the set of visual signatures characterizes a candidate object in the set of candidate objects; and means for transforming at least two candidate objects in the set of candidate objects into a single object according to a determination that correspondence between visual signatures for the at least two candidate objects satisfies one or more correspondence criteria.

In various implementations, the device 800 includes one or more processors, non-transitory memory, and a suitable combination of hardware, firmware, and/or software providing: means for generating a set of candidate objects based at least in part on a set of image data, where the set of image data includes image data from a plurality of image sources; means for generating a set of visual signatures, where each of the visual signatures in the set of visual signatures characterizes a candidate object in the set of candidate objects; and means for transforming at least two candidate objects in the set of candidate objects into a single object according to a determination that correspondence between visual signatures for the at least two candidate objects satisfies one or more correspondence criteria.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first object could be termed a second object, and, similarly, a second object could be termed a first object, which changing the meaning of the description, so long as all occurrences of the "first object" are renamed consistently and all occurrences of the "second object" are renamed consistently. The first object and the second object are both objects, but they are not the same object.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   generating a set of candidate objects based at least in part on a set of image data, wherein the set of image data includes image data from a set of frames captured by each image source of a plurality of image sources;
   generating a set of visual signatures, wherein each of the visual signatures in the set of visual signatures characterizes a candidate object in the set of candidate objects;
   generating, based on the set of visual signatures, a correspondence matrix of similarity scores between each candidate object of each frame of each image source and candidate objects of each of the other frames of each of the other image sources; and
   transforming at least two candidate objects in the set of candidate objects into a single object according to a determination that a similarity score from the correspondence matrix, between the at least two candidate objects, exceeds a threshold score.

2. The method of claim 1, further comprising:
   generating the similarity score by comparing the visual signatures associated with the at least two candidate objects.

3. The method of claim 1, which comprises a stateless method of establishing correspondence between the at least two candidate objects.

4. The method of claim 1, further comprising:
maintaining the correspondence matrix for tracking object similarity within a given time window.

5. The method of claim 1, wherein a first one of the at least two candidate objects corresponds to image data from a first one of the plurality of image sources captured in a first frame at a first time, and a second one of the at least two candidate objects corresponds to image data from a second one of the plurality of image sources also captured in a first frame at the first time.

6. The method of claim 1, wherein a first one of the at least two candidate objects corresponds to image data from a first one of the plurality of image sources captured in a first frame at a first time, and a second one of the at least two candidate objects corresponds to image data from a second one of the plurality of image sources captured in a second frame at a second time.

7. The method of claim 1, wherein a first one of the at least two candidate objects corresponds to image data from a first one of the plurality of image sources captured in a first frame at a first time, and a second one of the at least two candidate objects corresponds to image data from the first one of the plurality of image sources captured in a second frame at a second time.

8. The method of claim 1, further comprising:
determining that the at least two candidate objects are separate objects.

9. The method of claim 1, wherein each visual signature is a function of one or more attributes.

10. The method of claim 9, wherein the one or more attributes include at least one of a color histogram of the respective candidate object, a geometric signature for the respective candidate object, a texture signature for the respective candidate object, a motion vector for the respective candidate object, or a feature profile associated with one or more features of the respective candidate object.

11. The method of claim 1, further comprising:
synthesizing a composite characterization profile for the single object based at least in part on the visual signatures that correspond to the at least two candidate objects.

12. The method of claim 11, wherein synthesizing a composite characterization profile for the single object comprises merging the visual signatures that correspond to the at least two candidate objects to obtain the composite characterization profile for the single object.

13. The method of claim 11, wherein synthesizing a composite characterization profile for the single object comprises interpolating the visual signatures that correspond to the at least two candidate objects to obtain the composite characterization profile for the single object.

14. The method of claim 1, further comprising:
obtaining coordinates for the plurality of image sources; and
determining a location for the single object based at least in part on locations of the at least two candidate objects in the first set of image data and the coordinates of the plurality of image sources.

15. The method of claim 14, further comprising:
updating the similarity score for the visual signatures that correspond to the at least two candidate object based at least in part on the determined location of the object.

16. A non-transitory memory storing one or more programs, which, when executed by one or more processors of a device, cause the device to:
generate a set of candidate objects based at least in part on a set of image data, wherein the set of image data includes image data from a set of frames captured by each image source of a plurality of image sources;
generate a set of visual signatures, wherein each of the visual signatures in the set of visual signatures characterizes a candidate object in the set of candidate objects;
generate, based on the set of visual signatures, a correspondence matrix of similarity scores between each candidate object of each frame of each image source and candidate objects of each of the other frames of each of the other image sources; and
transform at least two candidate objects in the set of candidate objects into a single object according to a determination that a similarity score from the correspondence matrix, between the at least two candidate objects, exceeds a threshold score.

17. The non-transitory memory of claim 16, wherein a first one of the at least two candidate objects corresponds to image data from a first one of the plurality of image sources captured in a first frame at a first time, and a second one of the at least two candidate objects corresponds to image data from a second one of the plurality of image sources also captured in a first frame at the first time.

18. The non-transitory memory of claim 16, wherein a first one of the at least two candidate objects corresponds to image data from a first one of the plurality of image sources captured in a first frame at a first time, and a second one of the at least two candidate objects corresponds to image data from a second one of the plurality of image sources captured in a second frame at a second time.

19. The non-transitory memory of claim 16, wherein a first one of the at least two candidate objects corresponds to image data from a first one of the plurality of image sources captured in a first frame at a first time, and a second one of the at least two candidate objects corresponds to image data from the first one of the plurality of image sources captured in a second frame at a second time.

20. A device comprising:
one or more processors;
a non-transitory memory;
means for generating a set of candidate objects based at least in part on a set of image data, wherein the set of image data includes image data from a set of frames captured by each image source of a plurality of image sources;
means for generating a set of visual signatures, wherein each of the visual signatures in the set of visual signatures characterizes a candidate object in the set of candidate objects;
means for generating, based on the set of visual signatures, a correspondence matrix of similarity scores between each candidate object of each frame of each image source and candidate objects of each of the other frames of each of the other image sources; and
means for transforming at least two candidate objects in the set of candidate objects into a single object according to a determination that a similarity score between the at least two candidate objects exceeds a threshold score.

* * * * *